US011343328B2

(12) United States Patent
Devireddy et al.

(10) Patent No.: US 11,343,328 B2
(45) Date of Patent: May 24, 2022

(54) FAILOVER PREVENTION IN A HIGH AVAILABILITY SYSTEM DURING TRAFFIC CONGESTION

(71) Applicant: VMware, Inc., Palo Alto, CA (US)

(72) Inventors: Dileep Devireddy, San Jose, CA (US); Ankit Parmar, Santa Clara, CA (US); Subin Cyriac Mathew, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/020,559

(22) Filed: Sep. 14, 2020

(65) Prior Publication Data

US 2022/0086237 A1 Mar. 17, 2022

(51) Int. Cl.
| H04L 67/142 | (2022.01) |
| G06F 9/50 | (2006.01) |
| H04L 12/66 | (2006.01) |
| H04L 43/08 | (2022.01) |
| H04L 43/16 | (2022.01) |
| H04L 45/64 | (2022.01) |

(52) U.S. Cl.
CPC .......... *H04L 67/142* (2013.01); *G06F 9/505* (2013.01); *H04L 12/66* (2013.01); *H04L 43/08* (2013.01); *H04L 43/16* (2013.01); *H04L 45/64* (2013.01)

(58) Field of Classification Search
CPC ....... H04L 67/142; H04L 12/66; H04L 43/08; H04L 43/16; H04L 45/64; G06F 9/505
See application file for complete search history.

(56) References Cited

U.S. PATENT DOCUMENTS

| 2007/0253329 A1* | 11/2007 | Rooholamini ..... H04Q 3/54558 370/220 |
| 2007/0296550 A1* | 12/2007 | Hatanaka ............ H04L 67/1002 340/10.1 |
| 2008/0201602 A1* | 8/2008 | Agarwal ............. G06F 11/2097 714/4.1 |
| 2009/0037367 A1* | 2/2009 | Wein ...................... G06F 9/5061 |
| 2013/0318221 A1* | 11/2013 | Anaya ................. G06F 11/2097 709/223 |
| 2015/0112931 A1* | 4/2015 | Bourbonnais ........... G06F 16/27 707/626 |
| 2016/0210209 A1* | 7/2016 | Verkaik ............... G06F 11/2033 |
| 2016/0246867 A1* | 8/2016 | Bourbonnais ....... G06F 11/2035 |
| 2018/0095845 A1* | 4/2018 | Sanakkayala ........... H04L 43/10 |
| 2019/0235939 A1* | 8/2019 | Warrum ................ G06F 11/073 |
| 2019/0245735 A1* | 8/2019 | Umezawa ............... H04L 43/10 |
| 2019/0306036 A1* | 10/2019 | Boutros ............. H04L 41/0668 |
| 2019/0306064 A1* | 10/2019 | Masurekar ............. H04L 45/04 |

* cited by examiner

*Primary Examiner* — Philip J Chea
*Assistant Examiner* — Mohammed Ahmed

(57) ABSTRACT

In some embodiments, a method detects a state of a first session between a first workload and a second workload. The first workload and the second workload send packets in the first session via a first path to maintain a state of the first session. When the state of the first session indicates the first workload is down, the method receives information for network metrics of network traffic being sent in the first path. The method determines when the second workload should transition from a standby mode to an active mode to take over as an active workload in an active/standby configuration between the first workload and the second workload based on the information for the network metrics.

21 Claims, 6 Drawing Sheets

FAILOVER PREVENTION IN A HIGH AVAILABILITY SYSTEM DURING TRAFFIC CONGESTION

BACKGROUND

A high availability (HA) system may be resilient to failures of the system's components. Typically, this is achieved by providing redundant components so that if one component fails, a redundant component can take over performing the tasks of the failed component. High availability devices, such as edge services gateways, may be grouped into clusters. The nodes in a cluster may work as a team to provide services even if some of the nodes fail. As long as at least one of the nodes in a cluster remains active, the cluster may provide the services configured on the nodes. Examples of the services may include load balancing, traffic forwarding, data packet processing, virtual private network (VPN) services, domain name system (DNS) services, and the like. Workloads in a cluster may operate in either an active mode or a standby mode. If a workload that is designated as the active workload in a cluster fails, then, if possible, a surviving standby workload assumes the active role and provides the services that were configured on the failed workload.

The active workload and the standby workload may use a heartbeat mechanism that is based on a protocol, such as Bidirectional Forwarding Detection (BFD), to determine when the active workload fails. The protocol may require both the active workload and the standby workload to send heartbeat packets between them. In some cases, a host that is running the active workload may experience transient network congestion, which may result in the dropping of heartbeat packets. The dropping of heartbeat packets may trigger a failover where the standby workload takes over for the active workload even though the active workload is still available. This may result in problems in the network. For example, any failover situation may result in loss of network connectivity to network appliances, such as management devices and workloads in the network. Also, a split-brain condition may occur where there are two active workloads if the current active workload did not fail. The split-brain condition may result in network disruption, which could lead to loss of connectivity to all devices of the network (e.g., workloads and management devices), or other problems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
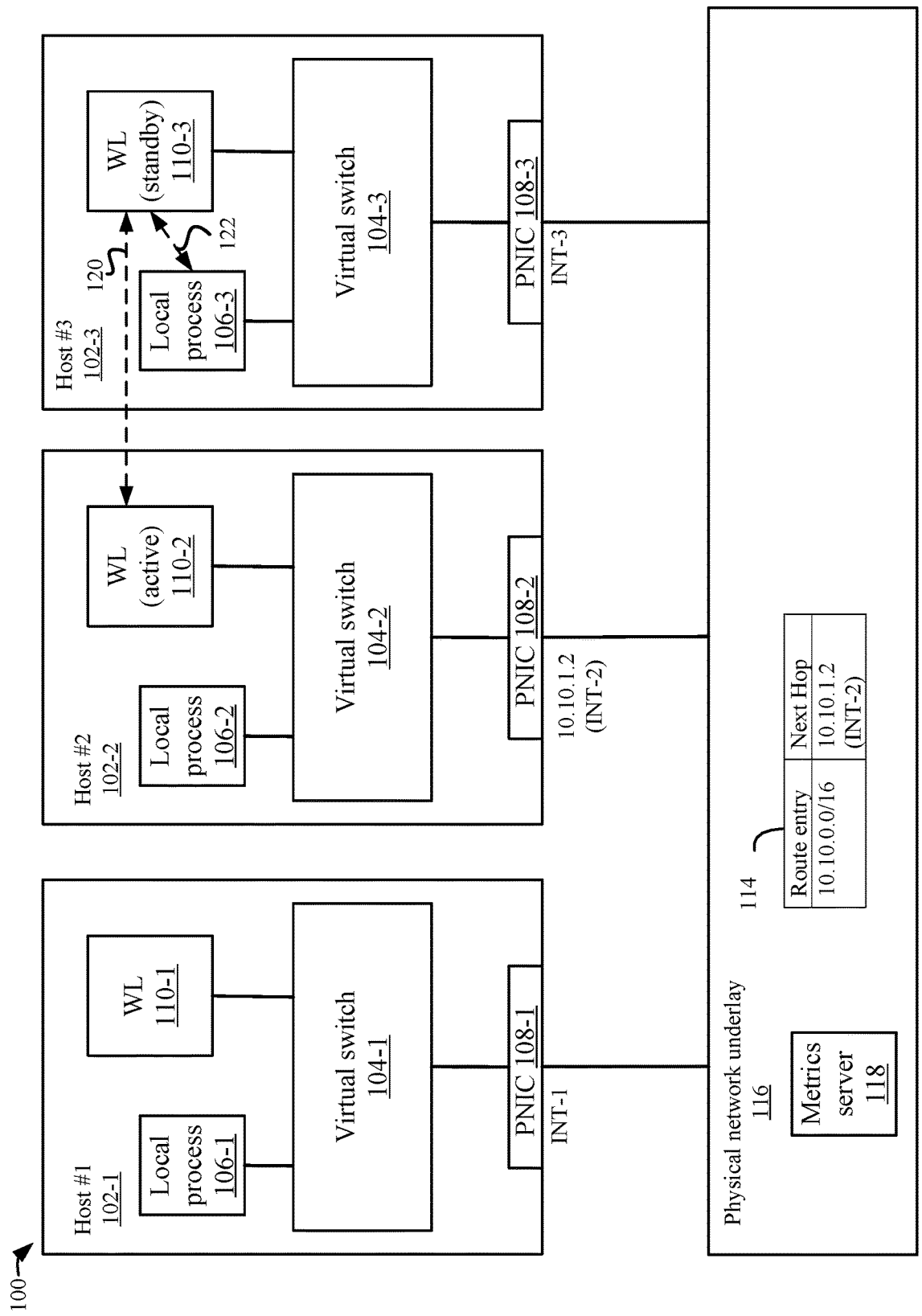
FIG. 1 depicts an example of a simplified system for a high-availability system according to some embodiments.

In the following description, for purposes of explanation, numerous examples and specific details are set forth to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should not be construed as limiting in any way.

In a high availability system, an active workload and a standby workload communicate in a first heartbeat session using a protocol, such as bidirectional forwarding detection (BFD), to determine when a failover event occurs. When the failover event occurs, the standby workload determines that the active workload has failed, and the standby workload takes over for the active workload becoming the new active workload. In some examples, the active workload may be a device that processes a large amount of traffic. For example, the active workload may be an edge services gateway between workloads hosted on hosts in a data center and devices in an external network. The edge services gateway provides various centralized services, such as network address translation (NAT), firewall services, virtual private network (VPN) services, etc. The edge services gateway may be in a critical path between workloads running in the data center and the external devices, such as on-premises workloads or clients communicating with workloads in the data center via the external network. That is, the active edge services gateway may receive all network traffic from workloads in the data center for external devices and all network traffic from external devices for workloads in the data center. Accordingly, a host that is hosting the active edge services gateway may process a lot more network traffic than other hosts that do not have an active edge services gateway running on them. Accordingly, the host physical network interface card (PNIC) or host network software may experience transient network congestion due to bursts in network traffic, which may require the host to drop packets. When packets are dropped, the heartbeat packets that are being sent between the standby workload and the active workload may be dropped, which may cause the standby workload to initiate a failover process. As discussed above in the Background, this may result in network disruption and/or split-brain conditions. Further, even if the standby workload successfully takes over as the active workload, the host with the newly active workload may now experience the high network traffic and result in heartbeat packets being dropped again. This may result in another failover and more network disruption.

Some embodiments overcome the above problems by using a process that analyzes network metrics on a host that is running an active workload. The process may monitor the network metrics and the standby workload can use the network metrics to determine whether to initiate a failover process to take over for the active workload. The process may communicate information for the network metrics to the standby workload in different ways, such as via different communication methods. For example, the process and the standby workload may initiate a second heartbeat session between them, such as a BFD session to transmit heartbeat packets between them. Thus, the standby workload includes a first heartbeat session between the active workload and itself and a second heartbeat session between the process and itself. The second heartbeat session is used to determine when the host running the active workload is experiencing high network traffic and may be dropping heartbeat packets.

In some embodiments, the process may bring down the second heartbeat session when the network metrics do not indicate there is high network traffic on the host that is running the active workload. When the standby workload detects the first heartbeat session between the active workload and the standby workload is down, the standby workload determines whether there is high network traffic on the host that is running the active workload. For example, if the second heartbeat session between the local process and the standby workload is still active, then the standby workload determines that there is high network traffic on the host running the active workload, and heartbeat packets may have been dropped causing the first heartbeat session to be torn down. The standby workload may not initiate the failover process when the host running the active workload is experiencing high network traffic. However, if the network metrics indicate there is not high network traffic on the host that is running the active workload, then the standby workload may determine that a failover is needed. When network traffic is not high, this may indicate that heartbeat packets are not being dropped at the host running the active workload. Accordingly, instead of immediately initiating the failover process upon the first heartbeat session being brought down, the standby workload includes a second mechanism using the second heartbeat session to prevent unnecessary failovers in high availability systems due to high network traffic at the host running the active workload.

System Overview

FIG. 1 depicts an example of a simplified system 100 for a high-availability system according to some embodiments. System 100 includes three hosts #1 to #3 102-1 to 102-3; however, a different number of hosts may be used. System 100 may be part of a data center, such as a public data center, that is hosted by a cloud provider.

Hosts 102 may be referred to as computing devices, host computers, host devices, physical servers, server systems, or physical machines. Each host 102 may be configured to support multiple workloads. Workloads may refer to virtual machines that are running on a respective host, but this is one example of a virtualized computing instance or compute node. Any suitable technology may be used to provide a workload, such as virtual machines, containers, etc. Although a virtualized environment is described, some embodiments may be used in an environment that is not virtualized. Also, the term "workload" may refer to a host that is not virtualized.

The hypervisors (not shown) or other virtualization or host software of hosts 102-1 to 102-3 may be configured to implement virtual switches 104-1 to 104-3 (collectively virtual switches 104) and forwarding tables and additional components (not shown) that connect workloads together and facilitate sending data traffic between workloads. Workloads may reside (or addressable from) the physical network underlay, or may reside on a logical overlay network, which is logically decoupled from the underlay. Virtual switches 104 may be software-implemented physical switches that perform functions of physical switches.

A public cloud provider or an enterprise datacenter may offer Layer 3 network connectivity between hosts 102 that may be referred to as a physical underlay network 116. In this example, virtual switches 104-1 to 104-3 have logical interfaces coupled to workloads. Virtual switches 104-1 to 104-3 are coupled via respective uplink ports to physical network interface cards (PNICs) 108-1 to 108-3 (collectively PNICs 108). PNICs 108-1 to 108-3 couple respective hosts 102-1 to 102-3 to underlay 116 via network interfaces INT-1, INT-2, and INT-3, respectively.

Routers (not shown) in underlay 116 may include an instance of underlay route table 114, which may include route entries that are used to route packets to a next hop for a destination. For example, a route entry for networks with the address range of "10.10.0.0/16" may route packets within the address range to a next hop address. For example, the next hop address may direct the packet to PNIC 108-2, which may use an address of 10.10.1.2 for an interface INT-2 to PNIC 108-2. Virtual switch 104-2 may receive the packet and send the packet to active workload 110-2, which processes the packet before forwarding the packet to the destination address. For example, a router in underlay 116 may route the packet to PNIC 108-2 via an interface INT-2 for host 102-2, which is running active workload 110-2. Virtual switch 104-2 may send the packet to active workload 110-2. Although only one route is shown in underlay route table 114, other routes may be included to route network traffic in the data center.

Among the workloads, hosts 102 may support an active workload 110-2 and a standby workload 110-3. A high availability system may include an active device that operates in an active mode and a standby device that operates in the standby mode. The active device is active in that it actively performs a function while the standby device does not perform that function until transitioning from the standby mode to the active mode. For example, active workload 104 is designated as the active device in the high availability system and standby workload 118 is designated as a standby device that can take over as active device when standby workload 118 determines that active edge workload 104 has failed. Although a single active workload and a single standby workload, it is noted that other configurations for high availability may be appreciated, including multiple active and/or multiple standby devices. Also, it is noted that additional workloads (e.g., workload 110-1 and workloads that are not shown) may be supported by hosts 102.

In some embodiments, active workload 110-2 may be an active edge services gateway workload and standby workload 110-3 may be a standby edge services gateway workload. An edge services gateway may provide connectivity between devices attached to a physical network and devices attached to one or more overlay (software-defined) networks (not shown). Each overlay network may be implemented by a set of forwarding devices distributed on multiple hosts 102, which establish between them tunnels across the underlay thereby logically decoupling the overlay networks from underlay 116. For overlay networks to be reachable via the edge services gateway implemented by active workload 110-2, routes for the overlay network need to be programmed with a next hop associated with the edge services gateway in underlay route table 114. The active edge services gateway processes all network traffic to/from workloads from/to an external network while the standby edge services gateway does not process any network traffic unless the standby edge services gateway transitions from a standby mode to the active mode to become the active edge services gateway. Edge services gateways are described for discussion purposes, and other workloads that are in a high availability system may be used and do not need to be edge services gateways. Accordingly, the following concepts may be applied to any workloads in an active-standby configuration.

Active workload 110-2 and standby workload 110-3 run a failure detection process that may involve sending messages (e.g., heartbeat messages) between themselves using a protocol, such as BFD. The messages may be referred to as heartbeat packets, which may be control messages that carry information for the failure detection process. The heartbeat packets are sent in an established heartbeat session between peers (e.g., active workload 110-2 and standby workload 110-3). Although the BFD protocol, heartbeat packets and heartbeat sessions are discussed, other protocols may be used and embodiments are not limited to using heartbeat packets and heartbeat sessions. The failure detection process is employed to make sure services provided by active workload 110-2 are always available where standby workload 110-3 takes over as the active workload when standby workload 110-3 detects a failure of active workload 110-2.

Standby workload 110-3 and active workload 110-2 may establish a first heartbeat session between themselves as shown at 120. The actual path of heartbeat packets in the first heartbeat session between standby workload 110-3 and active workload 110-2 may be between host 102-3 and host 102-2 via underlay 116. For example, the path may be from standby workload 110-3 to one or more routers (not shown) in underlay 116 via virtual switch 104-3 and PNIC 108-3. One or more routers may route the heartbeat packet to active workload 110-2 via interface INT-2 to PNIC 108-2. Active workload 110-2 may send heartbeat packets to standby workload 110-3 in the opposite direction via interface INT-2. As mentioned above, in addition to heartbeat packets, packets from networks behind active workload 110-2 may also be routed through interface INT-2 to active workload 110-2.

As discussed above, a problem may result when heartbeat packets are dropped at host 102-2 due to network congestion. For example, PNIC 108-2, or other devices along the data path, may drop packets being sent to or received from interface INT-2. To overcome the problem, standby workload 110-3 uses network metrics to determine whether to take over as the active workload. Standby workload 110-3 may receive information for the network metrics in different ways. For example, as will be discussed in more detail below, standby workload 110-3 establishes a second heartbeat session shown at 122 with local process 106-3 where local process 106-3 and standby workload 110-3 send heartbeat packets between themselves. In some embodiments, the heartbeat packets sent between local process 106-3 and standby workload 110-3 are not subject to the congestion that may be experienced through interface INT-2 of host 102-2. For instance, because local process 106-3 and standby workload 110-3 are both connected directly to virtual switch 104-3, heartbeat packets can be sent between them using virtual switch 104-3 without using underlay 116.

However, local process 106-3 may be running elsewhere, such as on other hosts other than host 102-2 such that the heartbeat packets do not go through interface INT-2, in standby workload 110-3, in another workload, etc.

In other methods, local process 106-3 may be inside the standby workload 110-3 and an inter-process communication message can be sent between them. Also, local process 106-3 may be in a hypervisor of host 102-3 and a communication between the hypervisor and standby workload 110-3 is used, such as a back-channel hypercall could be used. Further, local process 106-3 may be in a different workload or container, and an application programming interface (API) can be used to signal information on the network metrics. Accordingly, a heartbeat session may not be used between local process 106-3 and standby workload 110-3 to communicate the network metrics. In some cases, these methods may use a second session and bring down the session as described below, or a signal that indicates interface INT-2 is not experiencing high network traffic (or low network traffic) may be sent.

Local processes 106-1 to 106-3 may monitor network metrics that are collected by a metrics server 118. Metrics server 118 may be located in underlay 116, but any server that can provide network metrics may be used. Metrics server 118 may monitor the network usage in the path between active workload 110-2 and standby workload 110-3. The monitoring may be at different points in the path. In some embodiments, metrics server 118 may monitor network usage at interfaces between PNICs 108 and underlay 116, but the network usage may be monitored at other points in the path in which heartbeat packets are sent. However, interface INT-2 is the interface that is processing the heartbeat packets in the first heartbeat session and the network metrics from that interface provide insight into the network traffic in the path in which heartbeat packets are being sent. The network usage may include different metrics that measure an amount of network traffic, such as network packets received, network packets sent, network bytes received, and network bytes sent. The network packets received may be the number of packets received at interface INT-2 from underlay 116; the network packets sent may be the number of packets sent through interface INT-2 to underlay 116; the network bytes received may be the number of bytes received in packets at interface INT-2 from underlay 116; and the network bytes sent may be the number of bytes sent through interface INT-2 to underlay 116. Metrics server 118 may also provide other metrics that can be used to determine the network traffic congestion in the path in the first heartbeat session, such as usage of computing or network resources in host 102-2. The usage of computing or network resources may help to determine whether PNIC 108-2 may be dropping packets due to high usage of computing or network resources.

Local process 106-3 uses the network metrics to determine when network congestion is being experienced at interface INT-2 for host 102-2. Local process 106-3 provides information for the network metrics to standby workload 110-3. In some embodiments, local process 106-3 controls the state of the second heartbeat session to relay the information to standby workload 110-3. For example, to relay the state that interface INT-2 is not experiencing high network traffic, local process 106-3 may bring down the second heartbeat session. Also, to relay the state that interface INT-2 is experiencing high network traffic, local process 106-3 may bring up the second heartbeat session. Other methods may be used to relay the network congestion of interface INT-2, but one reason the second heartbeat session is down when interface INT-2 is not experiencing high network congestion is that heartbeat packets are not sent during this time and this may save some bandwidth as most of the time, interface INT-2 may not be experiencing high network congestion. As will be described in more detail below, standby workload 110-3 uses the two heartbeat sessions to determine when to initiate a failover process, such as when both the first heartbeat session and the second heartbeat session are down.

Initial Configuration

Figure 2:
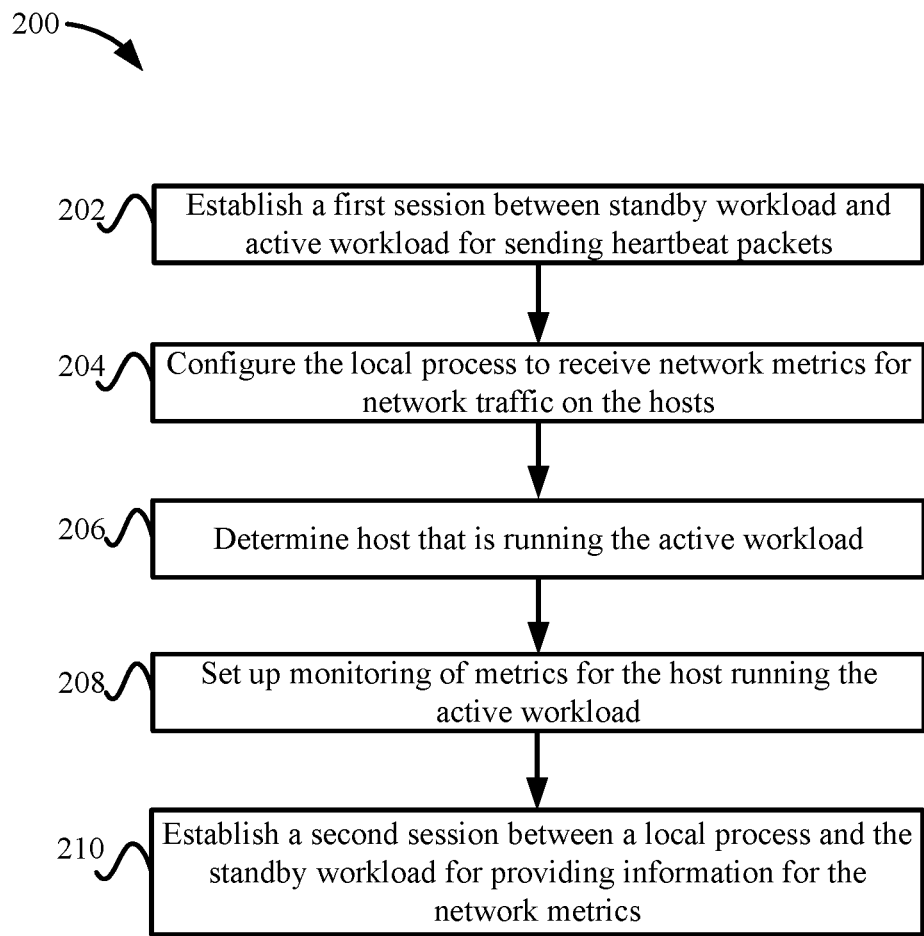
FIG. 2 depicts an initial configuration process for establishing heartbeat sessions according to some embodiments.

FIG. 2 depicts an initial configuration process for establishing heartbeat sessions according to some embodiments. Different workloads in hosts 102 may be designated as the active workload and standby workload. When the active workload and standby workload are set, a local process associated with the standby workload may be configured to receive network metrics for a detected active workload. At 202, standby workload 110-3 and active workload 110-2 establish a first heartbeat session for sending heartbeat packets between them. For example, local process 106-2 may broadcast the IP address for active workload 110-2. Standby workload 110-3 uses the IP address to send heartbeat packets to active workload 110-2. In some examples, the route may advertise the IP address of active workload 110-2 and an interface that is used as the next hop to send heartbeat packets. Standby workload 110-3 may receive the broadcast and set a route in a local route table (not shown) in virtual switch 104-3 that routes heartbeat packets from standby workload 110-3 to active workload 110-2 via underlay 116. Local process 106-3 may also perform a similar process for standby workload 110-3 by advertising a route for standby workload 110-3 that includes the IP address of standby workload 110-3 and a next hop interface INT-3 to reach standby workload 110-3. Accordingly, packets sent between active workload 110-2 and standby workload 110-3 are routed via underlay 116. Although the above method of establishing a heartbeat session is described, it will be understood that establishing a heartbeat session may include additional communication that is not described.

At 204, local process 106-3 is configured to receive network metrics for network traffic on hosts 102. For example, local process 106-3 may need appropriate permissions to access network metrics from metrics server 118. Then, local process 106-3 determines the appropriate network metrics to request. For example, at 206, local process 106-3 determines a host 102 that is running active workload 110-2. In some examples, active workload 110-2 may have advertised itself as the active workload and can determine which host 102-2 is running active workload 110-2. At 208, local process 106-3 then sets up monitoring of network metrics for host 102-2 that is running active workload 110-2. For example, local process 106-3 may communicate with metrics server 118 to request certain network metrics for interface INT-2 at host 102-2.

At 210, local process 106-3 and standby workload 110-3 establish a second session for providing information for the network metrics to standby workload 110-3. For example, local process 106-3 and standby workload 110-3 establish a second heartbeat session for sending heartbeat packets. Local process 106-3 and standby workload 110-3 may establish the second session similar to that described above. For example, local process 106-3 may advertise a route to reach itself and standby workload 110-3 performs the same. Virtual switch 104-3 may set a route in the local route table to route the heartbeat packets between local process 106-3 and standby workload 110-3. In some examples, the heartbeat packets sent between local process 106-3 and standby workload 110-3 may not be sent via underlay 116. Rather, since local process 106-3 and standby workload 110-3 are on the same host 102-3, virtual switch 104-3 routes the packets between local process 106-3 and standby workload 110-3 without using underlay 116. However, even if the heartbeat packets in the second session are sent via underlay 116, the packets may not go through interface INT-2.

Heartbeat Session Monitoring

Figure 3:
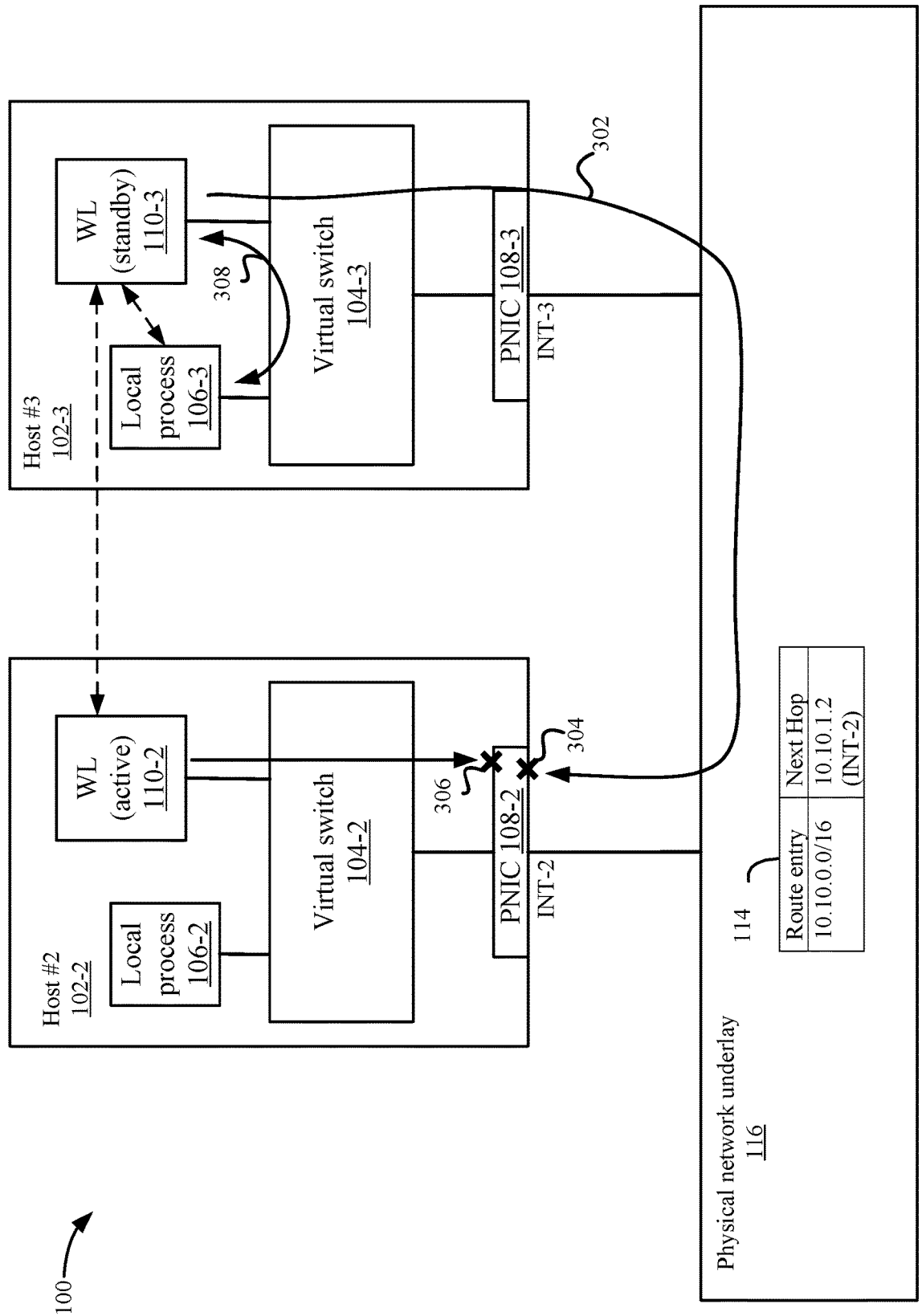
FIG. 3 depicts examples of paths for the two heartbeat sessions according to some embodiments.

After setting up the heartbeat sessions, standby workload 110-3, active workload 110-2, and local process 106-3 monitor the liveness of heartbeat sessions using heartbeat packets. FIG. 3 depicts examples of paths for the two heartbeat sessions according to some embodiments. Once configuring local route tables (not shown) with the routes for heartbeat packets, active workload 110-2 and standby workload 110-3 send heartbeat packets to each other using the routes and check the liveness of each other. The process of checking liveness in the BFD process may be implemented in different ways and variations may be appreciated. In the BFD protocol, peers may send heartbeat packets bidirectionally at determined intervals. One of active workload 110-2 or standby workload 110-3 may bring a heartbeat session down when a condition is met. For example, the standby workload 110-3 may bring down the heartbeat session when one or more heartbeat packets have not been received, or vice versa. It is noted that there may be other conditions to bring down a heartbeat session. Other protocols may also have other ways of bringing down sessions and bringing sessions up.

In a path at 302, at certain intervals, standby workload 110-3 generates and sends a heartbeat packet for a liveness check of active workload 110-2. The heartbeat packet is sent via underlay 116 from host #3 102-3 to host #2 102-2. For a successful liveness check, active workload 110-2 should receive the heartbeat packet, and vice versa. That is, PNIC 108-2 receives and processes the packet via interface INT-2, and forwards the packet to virtual switch 104-2, which sends the heartbeat packet to active workload 110-2. There may be instances where PNIC 108-2 is experiencing network congestions and drops packets. This may result in bringing down a heartbeat session even when active workload 110-2 is still available. For example, at 304, PNIC 108-2 may drop the packet. For example, PNIC 108-2 receives the heartbeat packet at interface INT-2, and stores the packet in receive queues. PNIC 108-2 processes packets from the receive queues, such as in a first in first out manner. In some embodiments, PNIC 108-2 does not use any priority when processing heartbeat packets. That is, PNIC 108-2 may treat heartbeat packets with the same priority as other packets, such as packets carrying data to and from other workloads 110 via active workload 110-2. Assuming there are not issues, PNIC 108-2 processes the heartbeat packet and successfully forwards the heartbeat packets to active workload 110-2 in a time required by the BFD protocol. However, due to network congestion, PNIC 108-2 may experience delays, which may lead to delays in processing packets or dropping packets. For example, PNIC 108-2 may drop packets because the packets are not processed from a queue within a set time period. Because no priority may be used for heartbeat packets, heartbeat packets may not avoid network congestion problems that may cause heartbeat packets to be delayed or dropped. Also, it is possible that even if priority is being used, which may give priority to heartbeat packets in the queues, delays or dropped heartbeat packets may still occur.

Active workload 110-2 also generates and sends a heartbeat packet to standby workload 110-3 at certain intervals.

The heartbeat packet is sent to PNIC 108-2, which should send the packet via interface INT-2 to underlay 116. However, similar to above, at 306, due to network congestion, PNIC 108-2 may experience delays in processing the heartbeat packet or drop the heartbeat packet. PNIC 108-2 may process the packets in send queues similar to that described above with respect to receive queues. That is, packets being sent are stored in the queue without priority and processed in a first in first out manner. Accordingly, PNIC 108-2 may delay or drop heartbeat packets due to network congestion towards interface INT-2. Accordingly, PNIC 108-2 may delay or drop packets in both directions.

In the second heartbeat session, at 308, standby workload 110-3 generates and sends a heartbeat packet for a liveness check of local process 106-3. The heartbeat packet may be sent via virtual switch 104-3. That is, the heartbeat packet in the second session may not be routed through underlay 116 towards interface INT-2 of PNIC 108-2, which avoids any congestion at PNIC 108-2. Local process 106-3 receives the heartbeat packet and can confirm the liveness of standby workload 110-3. Then, local process 106-3 generates and sends a heartbeat packet to standby workload 110-3. Similar to the heartbeat packet that was sent from standby workload 110-3 to local process 106-3, the heartbeat packet from local process 106-3 to standby workload 110-3 does not go through interface INT-2 of host 102-2. Standby workload 110-3 receives the heartbeat packet and confirms the liveness of active workload 110-2 of local process 106-3. For example, standby workload 110-3 confirms the state of the heartbeat packet includes the previous BFD was received by local process 106-3. Accordingly, local process 106-3 and standby workload 110-3 most likely do not bring down the second session because heartbeat packets are delayed or dropped. However, local process 106-3 may bring down the session for other reasons, such as when no network congestion is experienced at interface INT-2 of host 102-2. The use of the second heartbeat session in the failover process will be described in more detail now.

Failover Process

Figure 4:
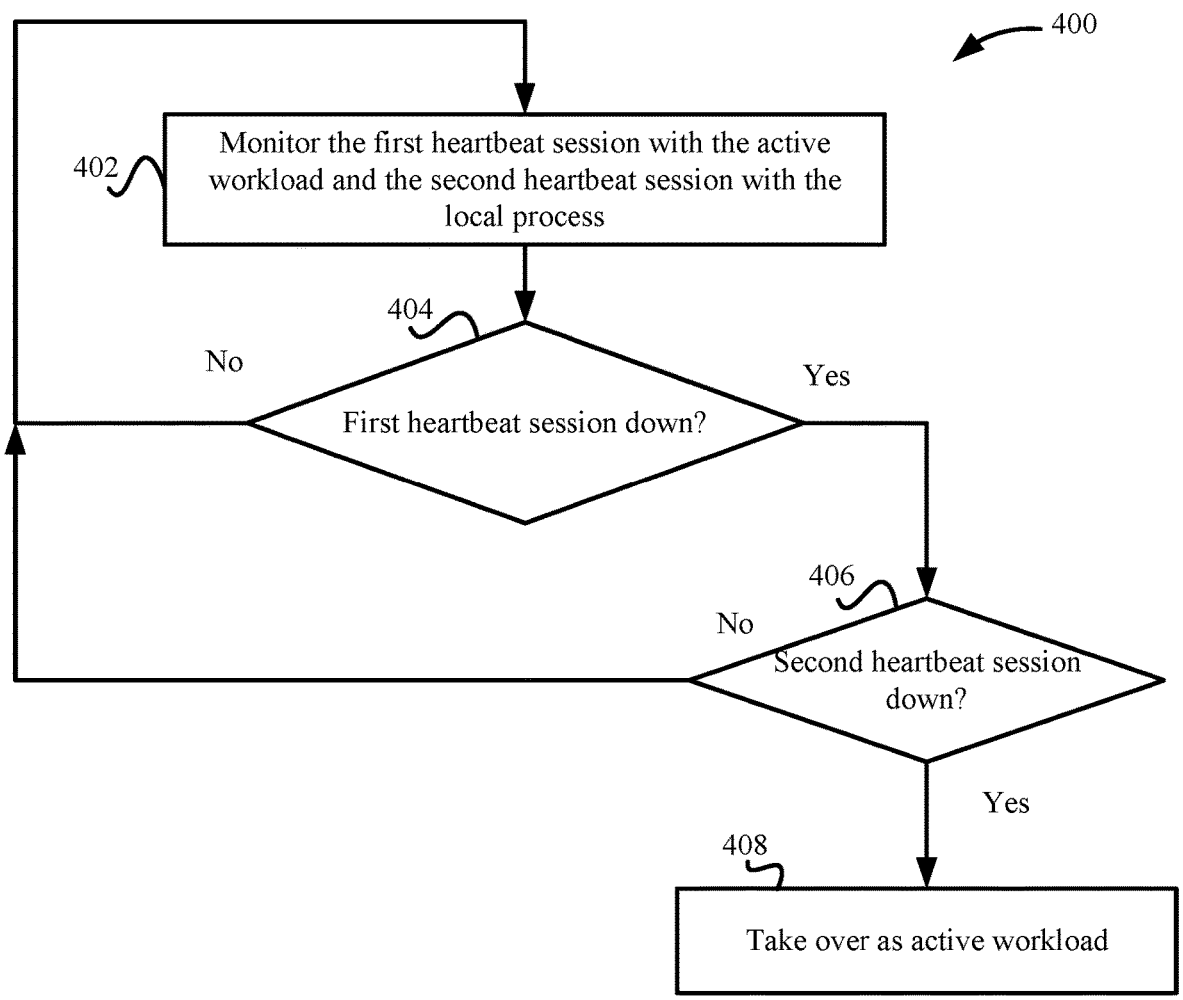
FIG. 4 depicts a simplified flowchart of a method for performing the failover process according to some embodiments.

Standby workload 110-3 can use the network metrics, such as via the status of second heartbeat session, and the status of the first heartbeat session to determine when to perform a failover process. FIG. 4 depicts a simplified flowchart 400 of a method for performing the failover process according to some embodiments. At 402, standby workload 110-3 monitors the first session with active workload 110-2 and the second session with local process 106-3. At 404, standby workload 110-3 determines if the first heartbeat session is down. For example, active workload 110-2 or standby workload 110-3 may bring down the first heartbeat session. Typically, standby workload 110-3 would initiate the failover process at this point. However, standby workload 110-3 performs a second test before starting the failover process.

If the first heartbeat session is down, at 406, standby workload 110-3 determines if the second heartbeat session is down. If the second heartbeat session is not down, then the process reiterates to 402 where standby workload 110-3 continues to monitor the first heartbeat session and the second heartbeat session. That is, if the second heartbeat session is not down, then standby workload 110-3 may not initiate the failover process due to the first heartbeat session being down. Rather, standby workload 110-3 may determine that the high network traffic at host 102-2 may have caused heartbeat packets to be dropped or delayed and active workload 110-2 is still active. This may avoid the case where active workload 110-2 is still active but not receiving heartbeat packets due to high network traffic at interface INT-2. To protect against the case where active workload 110-2 has failed and there is persistent high network traffic at host 102-2, in some embodiments, if the first heartbeat session is not re-instantiated after a time period, then standby workload 110-3 may initiate a failover process. For example, the network congestion at host 102-2 may be transient and active workload 110-2 and standby workload 110-3 may reinitiate the first heartbeat session after the network congestion passes. However, if active workload 110-2 has truly failed, then standby workload 110-3 will perform the failover process after a time period has passed even if high network congestion is still be experienced at host 102-2.

Although this method of bringing up the second heartbeat session to indicate high network traffic at interface INT-2 and bringing down the second session to indicate low network traffic is being experienced at interface INT-2, other methods may be used. For example, local process 106-3 may take down the second heartbeat session when low network traffic is being experienced at interface INT-2. Then, standby workload 110-3 may determine that high network traffic is being experienced when the second session is active and may not initiate a failover process when the first heartbeat session is down.

Figure 5:
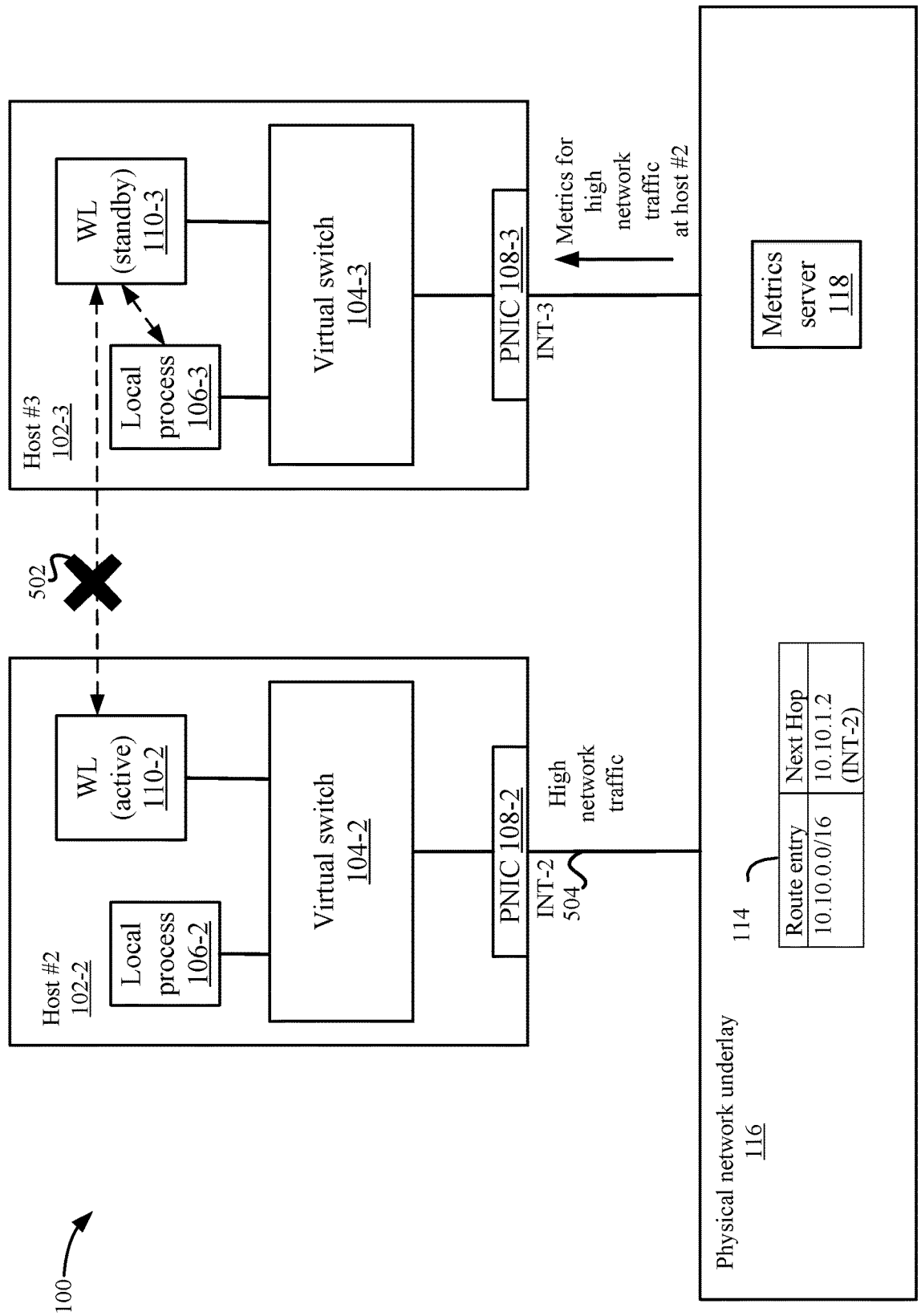
FIG. 5 depicts an example of a possible scenario when the first session is down and the second session is not down according to some embodiments.

FIG. 5 depicts an example of a possible scenario when the first session is down and the second session is not down according to some embodiments. At 502, the first session between active workload 110-2 and standby workload 110-3 is down. However, the second session between local process 106-3 and standby workload 110-3 is still active. For example, at 504, PNIC 108-2 may be experiencing high network traffic. Metrics server 118-2 may collect network metrics from the interface INT-2 at PNIC 108-2 and provide the network metrics to local process 106-3. Local process 106-3 may use different methods to determine whether to take the second session down. For example, local process 106-3 may compare the network metrics to one or more thresholds to determine whether to bring down the second heartbeat session. In some examples, local process 106-3 may compare the network packets received, network packets sent, network bytes received, network bytes sent to respective thresholds. In some examples, local process 106-3 may require one or more network metrics to meet (e.g., exceed) the threshold. That is, if one or more of the networks metrics exceeds a respective threshold, then local process 106-3 may determine that there is high network traffic at host 102-2 and may not take down the second session. In another example, local process 106-3 may require all the network metrics to exceed respective thresholds. Further, combinations of network metrics may be used, such as the network packets received are above a threshold or the network bytes received are above a threshold and/or the network packets sent or the network bytes sent are above respective thresholds. Various other methods may be used to test whether host 102-2 is experiencing high network traffic.

Referring back to FIG. 4, when both the first session is down and the second session is down, at 408, standby workload 110-3 takes over as the active workload. When local process 106-3 determines that there is not high network traffic at interface INT-2, such as when all the network metrics do not meet respective thresholds, local process 106-3 takes down the second heartbeat session. Thus, local process 106-3 takes the second session down when there is a low probability of dropping packets at PNIC 108-2 due to network traffic being considered low. Although the above method of using threshold to determine that the path being used in the first heartbeat session is not experiencing high network traffic, other methods may be used.

Figure 6:
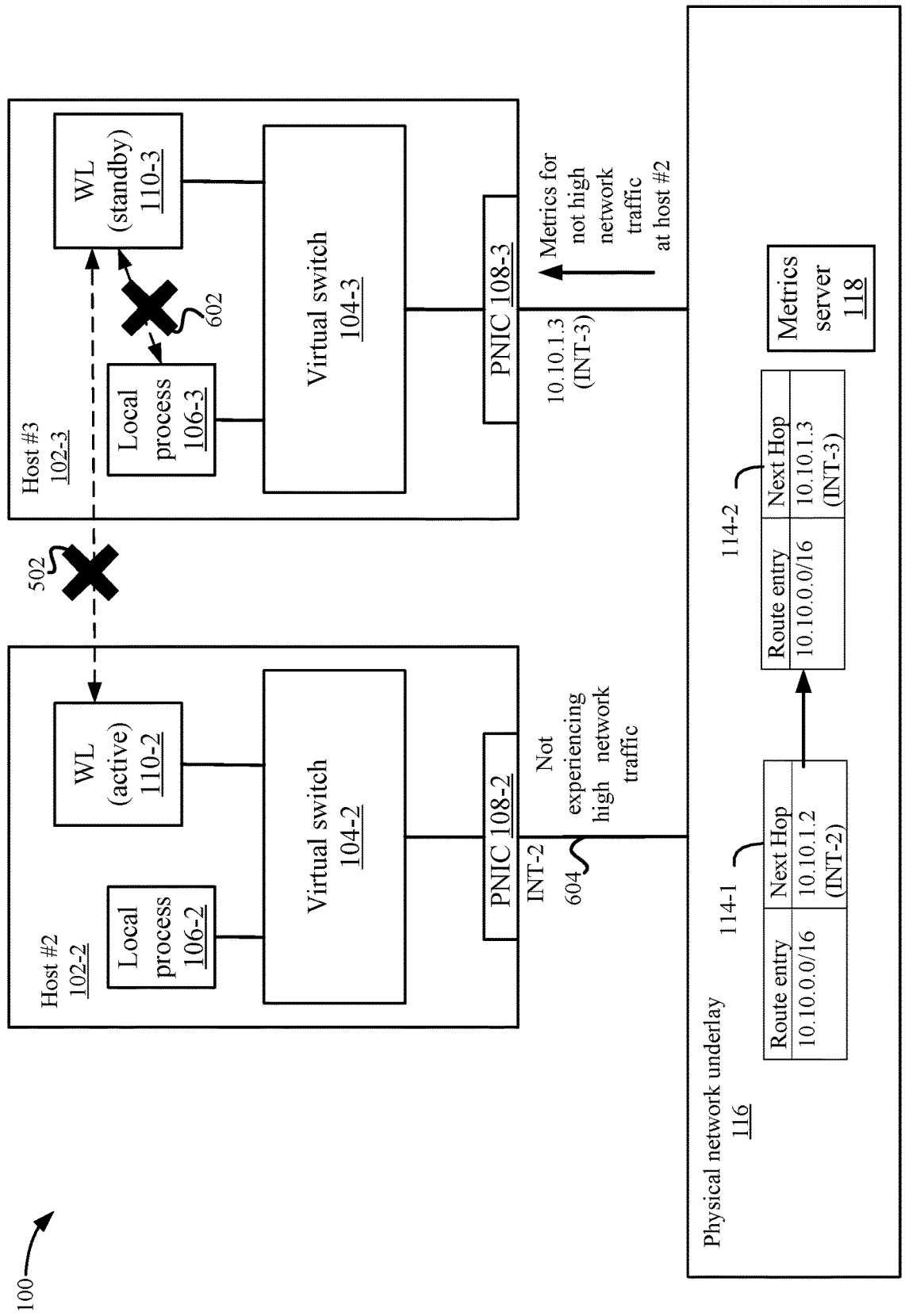
FIG. 6 depicts an example of when the first session and the second session are brought down according to some embodiments.

FIG. 6 depicts an example of when the first session and the second session are brought down according to some embodiments. At 602, the second session between local process 106-3 and standby workload 110-3 has been brought down. Local process 106-3 has torn the second heartbeat session down because interface INT-2 at PNIC 108-2 is not experiencing high network traffic as shown at 604. Similar to above, local process 106-3 may compare the network metrics to respective thresholds to determine whether to bring the second heartbeat session down. The comparison may determine whether one or more network metrics are do not meet (e.g., are below) respective thresholds. For example, the number of packets sent, bytes sent, packets received, and/or bytes received at interface INT-2 may be below respective thresholds. In this case, it is more likely that the heartbeat packets were not dropped and active workload 110-2 may have failed. Accordingly, standby workload 110-3 takes over as the active workload when both the first session and the second session are detected as being down. During the process, if at some point local process 106-3 determines that interface INT-2 is experiencing high network traffic, local process 106-3 may bring back up the second session with standby workload 110-3.

CONCLUSION

Accordingly, some embodiments provide a process to prevent unnecessary failovers in high availability systems where there is no prioritization of packets. The use of network metrics for an interface that receives and sends heartbeat packets at a host that is running the active workload can be used to determine whether to perform a failover process. Even if the first session between an active workload 110-2 and a standby workload 110-3 is down, standby workload 110-3 may not perform the failover process until the high network traffic condition is removed. This may ensure that the failover process is not performed when the high network congestion may be causing heartbeat packets to be dropped.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   detecting a state of a first session between a first workload and a second workload, wherein the first workload and the second workload send packets in the first session via a first path to maintain a state of the first session;
   when the state of the first session indicates the first workload is down, receiving information for network metrics of network traffic being sent in the first path;
   determining that the second workload should not transition from a standby mode to an active mode to take over as an active workload in an active/standby configuration between the first workload and the second workload when the information for the network metrics meets a threshold, wherein meeting the threshold indicates that high network traffic is being experienced in the first path; and
   determining that the second workload should transition from the standby mode to the active mode when the information for the network metrics does not meet the threshold, wherein not meeting the threshold indicates that high network traffic is not being experienced in the first path.

2. The method of claim 1, wherein the packets in the first session are sent in the first path via an underlay network that routes packets between a first host running the first workload and a second host running the second workload.

3. The method of claim 2, wherein the information for the network metrics are associated with an interface between the first host and the underlay network in the first path.

4. The method of claim 1, further comprising:
   detecting a state of a second session between the second workload and a process, wherein the process and the second workload send packets in a second path to maintain the state of the second session, and the process controls the state of the second session based on the information for the network metrics.

5. The method of claim 4, wherein:
   a device in the first path drops the packets sent between the first workload and the second workload in the first session, and
   the second path does not send the packets in the second session through the device.

6. The method of claim 1, further comprising:
   comparing the information for the network metrics to the threshold to determine when the second workload should transition from the standby mode to the active mode.

7. The method of claim 1, wherein:
   the first workload is an active edge services gateway device that processes network traffic for one or more workloads on networks behind the active edge services device, and the second workload is an edge services gateway device capable of becoming the active edge services gateway device upon determining a failure of the first workload.

8. A non-transitory computer-readable storage medium containing instructions, that when executed, control a computer system to be operable for:
   detecting a state of a first session between a first workload and a second workload, wherein the first workload and the second workload send packets in the first session via a first path to maintain a state of the first session;
   when the state of the first session indicates the first workload is down, receiving information for network metrics of network traffic being sent in the first path;
   determining that the second workload should not transition from a standby mode to an active mode to take over as an active workload in an active/standby configuration between the first workload and the second workload when the information for the network metrics meets a threshold, wherein meeting the threshold indicates that high network traffic is being experienced in the first path; and
   determining that the second workload should transition from the standby mode to the active mode when the information for the network metrics does not meet the threshold, wherein not meeting the threshold indicates that high network traffic is not being experienced in the first path.

9. The non-transitory computer-readable storage medium of claim 8, wherein the packets in the first session are sent in the first path via an underlay network that routes packets between a first host running the first workload and a second host running the second workload.

10. The non-transitory computer-readable storage medium of claim 9, wherein the information for the network metrics are associated with an interface between the first host and the underlay network in the first path.

11. The non-transitory computer-readable storage medium of claim 8, further operable for:
   detecting a state of a second session between the second workload and a process, wherein the process and the second workload send packets in a second path to maintain the state of the second session, and the process controls the state of the second session based on the information for the network metrics.

12. The non-transitory computer-readable storage medium of claim 11, wherein:
   a device in the first path drops the packets sent between the first workload and the second workload in the first session, and
   the second path does not send the packets in the second session through the device.

13. The non-transitory computer-readable storage medium of claim 8, further operable for:
   comparing the information for the network metrics to the threshold to determine when the second workload should transition from the standby mode to the active mode.

14. The non-transitory computer-readable storage medium of claim 8, wherein:
   the first workload is an active edge services gateway device that processes network traffic for one or more workloads on networks behind the active edge services device, and the second workload is an edge services gateway device capable of becoming the active edge services gateway device upon determining a failure of the first workload.

15. An apparatus comprising:
   one or more computer processors; and
   a non-transitory computer-readable storage medium comprising instructions, that when executed, control the one or more computer processors to be operable for:
   detecting a state of a first session between a first workload and a second workload, wherein the first workload and the second workload send packets in the first session via a first path to maintain a state of the first session;

when the state of the first session indicates the first workload is down, receiving information for network metrics of network traffic being sent in the first path;

determining that the second workload should not transition from a standby mode to an active mode to take over as an active workload in an active/standby configuration between the first workload and the second workload when the information for the network metrics meets a threshold, wherein meeting the threshold indicates that high network traffic is being experienced in the first path; and determining that the second workload should transition from the standby mode to the active mode when the information for the network metrics does not meet the threshold, wherein not meeting the threshold indicates that high network traffic is not being experienced in the first path.

16. The apparatus of claim 15, wherein the packets in the first session are sent in the first path via an underlay network that routes packets between a first host running the first workload and a second host running the second workload.

17. The apparatus of claim 16, wherein the information for the network metrics are associated with an interface between the first host and the underlay network in the first path.

18. The apparatus of claim 15, further operable for:

detecting a state of a second session between the second workload and a process, wherein the process and the second workload send packets in a second path to maintain the state of the second session, and the process controls the state of the second session based on the information for the network metrics.

19. The apparatus of claim 18, wherein:

a device in the first path drops the packets sent between the first workload and the second workload in the first session, and the second path does not send the packets in the second session through the device.

20. The apparatus of claim 15, further operable for:

comparing the information for the network metrics to the threshold to determine when the second workload should transition from the standby mode to the active mode.

21. The apparatus of claim 15, wherein:

the first workload is an active edge services gateway device that processes network traffic for one or more workloads on networks behind the active edge services device, and the second workload is an edge services gateway device capable of becoming the active edge services gateway device upon determining a failure of the first workload.

* * * * *